US 6,580,704 B1

(12) United States Patent
Wellig et al.

(10) Patent No.: US 6,580,704 B1
(45) Date of Patent: Jun. 17, 2003

(54) DIRECT MODE COMMUNICATION METHOD BETWEEN TWO MOBILE TERMINALS IN ACCESS POINT CONTROLLED WIRELESS LAN SYSTEMS

(75) Inventors: Armin Wellig, Sion (CH); Roland Kuntze, Tampere (FI); Juha Salokannel, Kangasala (FI)

(73) Assignee: Nokia Corporation, Esppo (FI)

( * ) Notice: Subject to any disclaimer, the term of this patent is extended or adjusted under 35 U.S.C. 154(b) by 0 days.

(21) Appl. No.: 09/384,025

(22) Filed: Aug. 26, 1999

(51) Int. Cl.[7] ................................................ H04Q 7/22
(52) U.S. Cl. ...................................... 370/338; 370/349
(58) Field of Search ............................... 370/218, 231, 370/233, 235, 252, 253, 274, 279, 285, 293, 312, 313, 315, 332, 333, 338, 337, 349, 331, 382, 383, 395.3, 401, 402, 405, 406, 432, 471, 475, 512; 455/417, 513, 426, 514, 450, 515, 458, 552, 553, 575, 518, 519; 375/356

(56) References Cited

U.S. PATENT DOCUMENTS

| | | | | |
|---|---|---|---|---|
| 5,515,366 A | * | 5/1996 | Chieu et al. | 370/347 |
| 5,519,706 A | * | 5/1996 | Bantz et al. | 370/329 |
| 5,737,328 A | | 4/1998 | Norman et al. | |
| 5,857,144 A | * | 1/1999 | Mangum et al. | 455/11.1 |
| 5,903,618 A | | 5/1999 | Miyake et al. | |
| 6,038,225 A | * | 3/2000 | Nago | 370/343 |
| 6,236,649 B1 | * | 5/2001 | Jun | 370/343 |
| 6,292,475 B1 | * | 9/2001 | Swail | 370/229 |
| 6,151,352 A1 | * | 11/2001 | Taki et al. | 375/132 |
| 6,343,220 B1 | * | 1/2002 | Van Der Salm | 455/422 |
| 6,414,986 B1 | * | 7/2002 | Usui | 370/328 |

FOREIGN PATENT DOCUMENTS

| | | |
|---|---|---|
| EP | 0713345 A2 | 5/1996 |
| WO | 95/17724 | 6/1995 |
| WO | 96/22663 | 7/1996 |
| WO | 99/21095 | 4/1999 |

OTHER PUBLICATIONS

"Calibration Mechanism for Direct Mode", HL14SON2a—ETSI EP BRAN#,4—Sophia Antipolis, Jun. 29–Jul. 2, 1999.
"DM Power Control Proposal", HL14SON3a—ETSI EP BRAN#,4—Sophia Antipolis, Jun. 29–Jul. 2, 1999.

* cited by examiner

Primary Examiner—Nay Maung
Assistant Examiner—Jean A Gelin
(74) Attorney, Agent, or Firm—Antonelli, Terry, Stout & Kraus, LLP

(57) ABSTRACT

There is featured a Direct Mode (DM) communication method between two mobile terminals (MTs) in access point (AP) controlled WLAN systems. The DM connection scheme calls for establishing that an initiating MT and a remote MT are associated to the same AP; establishing that the remote MT supports a DM operation feature; sending, by the AP, address identifiers of the initiating and remote MTs to the remote and initiating MTs, respectively; and sending, to the AP, RSS measurements performed by the initiating and remote MTs of MT identifying messages sent to them by the remote and initiating MTs, respectively. DM communication between the two MTs continues with exchange of information to conclusion when a MT identifying message is satisfactorily received by both MTs and when a MT identifying message of either MT is not satisfactorily received, DM communication setup is terminated.

26 Claims, 6 Drawing Sheets

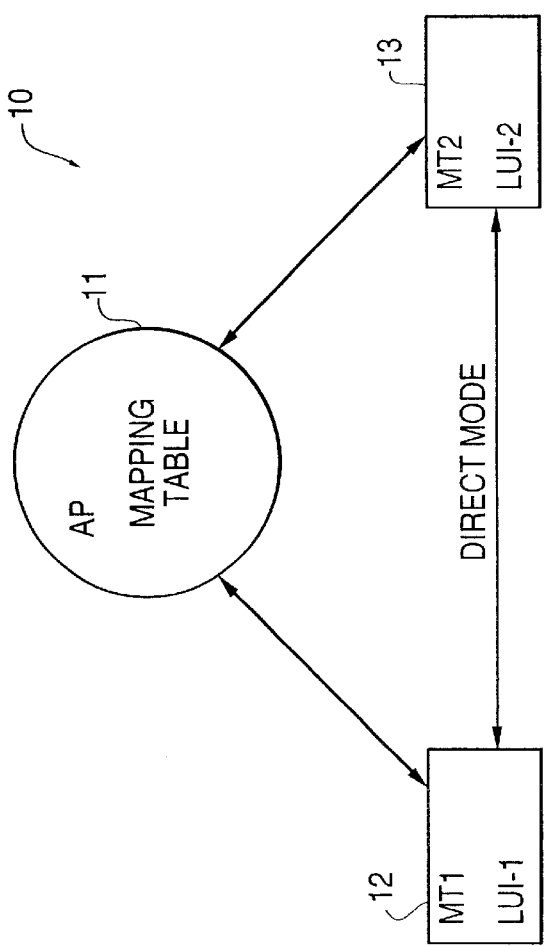

DIRECT MODE COMMUNICATION METHOD BETWEEN TWO MOBILE TERMINALS IN ACCESS POINT CONTROLLED WIRELESS LAN SYSTEMS

FIELD OF THE INVENTION

This invention relates, generally, to the field of telecommunications including wireless local area networks (WLANs) and, more particularly, to access point (AP) controlled WLAN systems which can facilitate communication directly between two mobile terminals having the same AP.

BACKGROUND OF THE INVENTION

Wireless local area networks (WLANs), constituted by a plurality of mobile terminals (mobile stations) such as mobile (cell) phones, notebook (laptop) computers which are facilitated with WLAN PC cards, and the like, communicate among themselves as well as through a network server, the network server providing support for communication between mobile terminals in different service sets (service areas) which are associated with different access points (APs). Such networks allow mobile terminals to be moved within a particular service area without regard to physical connections among the mobile terminals within that service area. An example of a model conforming to that developed by the IEEE 802.11 Committee is illustrated in FIG. 9 of the drawings. (Discussion of the IEEE 802.11 model for WLAN architectures is found on pages 442–443 of the text *Data and Computer Communications,* 5th Ed., by Wm. Stallings, published 1997 by Prentice-Hall, Inc.) Typically, all messages being transmitted among the mobile terminals of the same cell (same AP) in such WLAN schemes must be transmitted to the access point (AP) rather than being directly transmitted between the mobile terminals. Such centralized wireless communication provides significant advantages in terms of simplicity of the communication linkup as well as in power savings. However, such indirect communication between a pair of mobile terminals within a same AP also results in a bottleneck in that AP, noting that all the messages between any two stations within an AP service set must first be received by that AP and then be retransmitted to a destination point. Undesirably, this results, also, in the consumption of valuable communication bandwidth which also leads to an undesirable slowdown, especially when there exists a large number of mobile terminals within an AP service area.

For Direct Mode (DM) communication between two mobile terminals (MTs) in access point (AP) controlled WLAN systems to be successful, both MTs (1) have to be able to support DM, (2) they have to be associated to the same AP and (3) be able to create a wireless radio link with feasible (i.e., satisfactory) transmission power level. However, an underlying problem has existed in achieving this. Namely, there has been a problem of how the MTs as well as the associated AP know with certainty whether both of those MTs can have a DM radio linkup with a satisfactory transmission level prior to completion of the DM connection setup. (Direct Mode [DM], as referred to in the present application, means a Direct Mode communication linkup in which a direct or straight communication is effected between two MTs within the same AP service set of an AP controlled WLAN system.) Further, there has also been an underlying problem of how the initiating MT is able to create a DM connection to a remote, second MT of the same AP service area since the local unique identifier (LUI), which is generated by the AP to identify each MT associated with that AP, is not known by the other, remote MT. Any attempt at overcoming these problems must necessarily consider the following related issues: complexity, security, processing resources as well as channel usage.

The calibration scheme proposed by Sony International Europe as HL14SON2a, in the ETSI EP Bran (European Telecommunications Standards Institute EP Broadband Radio Access Network) No. 14 Conference, on July 1999, and incorporated herein reference, is based on a topology map stored in the AP computer which is to be used for finding out which MTs associated with that AP are feasibly located to permit DM communication. Such a topology map as that featured in HL14SON2a, July 1999, is presently illustrated as reference numeral 100 in FIG. 10 of the drawings with regard to a showing, in the discussion which follows, of the impracticality as well as the security concerns that would be raised in using such a topology map to effect a DM communication setup between two MTs.

The basic concepts of the Standard, as previously proposed in HL14SON2a, is to ascertain the network topology associated with an AP via a calibration mechanism. Each MT associated to the same AP, according to that proposal, performs received signal strength (RSS) measurements with respect to all other ones of the MTs of that AP and reports them to the AP. Once all MTs have reported their measurement results to the corresponding AP, the AP creates and stores a topology map of that network. Such a topology map as that illustrated in FIG. 10 of the drawings indicates the quality and connectivity between each MT with all other MTs associated with the same AP. Based on such a connectivity map as that illustrated in FIG. 10 of the drawings, a connection setup for a Direct Mode (peer-to-peer) session can be performed through coordinating the three key elements, namely, the two MTs which are to be included in DM connection as well as the associated AP. In order to facilitate such a radio communication hookup, the example given in HL14SON3A, also presented in the ETSI EP BRAN No. 14 conference of July 1999, is applicable in connection with achieving a regulated transmit power level for each MT, independent of the transmit power associated with the other MTs of that AP. The HL14SON3A proposal submitted in connection with the HIPERLAN/2 Standard is also incorporated herein by reference.

Regarding the addressing problem, referred to earlier, no solutions have yet to be proposed which are directed, especially, to DM communication in AP controlled WLAN systems, based on the inventors' knowledge. Also, the typical way of distributing data in WLAN systems is to broadcast information for all MTs periodically or to maintain a mapping list from the local unique identifiers (LUIs) which correspond to the higher layer addresses associated with each AP. (The higher layer addresses are typically internet protocol (IP) addresses or Ethernet addresses, mobile phone numbers, and the like.) In the above-noted HL14SON2a proposal (HIPERLAN2 proposed Standard), there exists a master/slave situation, in which the AP is always the master and MT is the slave. Since AP is dynamically associating/disassociating medium access control identifiers (MAC-Ids) to joining/leaving MTs, it becomes paramount, at least for security reasons, that the AP should be the only entity or player in any communication linkup within the network which has specific knowledge about the MAC-Id mapping within its cell. Spreading or loosely channeling such information to the MTs poses questions of the security of the network. To avoid such problem, only MTs which are assigned to the same cell (same AP) and which are involved in DM communication linkup, the inventors submit, should actually have the right to ask for the corresponding MAC-Id address of another MT in order to initiate a DM connection.

Considering that the information is being broadcasted via wireless radio channel, the topology map (as proposed in HL14SON2a) as well as the broadcasting of the addressing information (from the higher layer address associated with the corresponding MAC-Id) have a bottlenecking effect on channel usage. Such negative impact on channel usage is especially evident during the periodic calibration phase. Since not all of the MTs may support DM communication and since DM communication is effected rather infrequently (e.g., once per hour, maybe), broadcasting of the RSS and addressing information as well as effecting the calibration within a period which is short enough for purposes of updating the data has a deleterious effect on the capacity of the radio channel during such times.

With regard to the topological map shown in FIG. 10 of the drawings, which relates to the Sony contribution of the Standard proposal of HL14SON2a, mentioned above, an updating mechanism is available for regularly changing (updating) the received signal strength (RSS) measurements performed among the different MTs. The purpose of such mapping of the RSS of the local MAC-Id addresses is to have some means to quantify an actual updated list of the actual signal strength situation among the different MTs serviced by the same cell (same AP). According to such a scheme, an AP maintains a priori knowledge about the possibility of DM connection setup between two MTs. Referring to FIG. 10, RSS 2 3-1 represents the received signal strength at the mobile terminal having the MAC-Id3 address, of a message transmitted by the mobile terminal having the MAC-Id1 address. On the basis of such values held in such topological map, the AP can decide whether DM connection of a pair of MTs results in the feasible wireless radio link.

Although valuable information may appear to be contained in such a topological map, there are a number of drawbacks/hindrances that must be overcome if a practical and efficient DM linkup is to be effected. Among such drawbacks are the following:

(a) The reliability of the RSS values in the wireless indoor environment is unpredictable. Namely, if the MT is moving only slightly, especially, inside a building site, the current situation pertaining to the RSS values between that MT and all other MTs of the same cell may completely change (i.e., deep fading is observed, or the line of site (LOS) path between two MTs may no longer exist, etc.). Therefore, the RSS values in such a case, would not constitute a reliable information source even under a regular, periodic updating of the topological map. Under such conditions it would also not be reliable to effect an accurate characterization of an indoor channel in terms of the RSS level among the different MTs. As another example regarding the unreliability of the attained RSS values in an indoor environment, even if the RSS measurements have been recently updated, they are still unreliable. That is, while the mobile phone is laying on an office table somewhere in the building, the RSS measurements directed thereto have one set of values. However, when the user picks up the mobile phone from the table and dials the destination number, it is quite probable that the RSS signal measured under this condition would be totally different from the recently measured RSS value when the mobile phone was still on the table. For instance, the wavelength for 5 GHz carrier is about 6 cm. Therefore, any slight movements of the MT would result in a significant phase change and deep fading (e.g.., several dBs) could be observed due to occurrence of a multi-path propagation effect.

(b) In order to maintain a regular updating of the topological map, a great deal of information exchange is required that would have no relevance to a particularly desired DM connection to be effected. That is, even the inactive/powered down MTs must perform RSS measurements periodically in order to maintain a regularly updated topological map in the AP. Such has a wasting effect on the scarce channel resource available during a DM connection setup as well as during DM operation.

(c) In order to perform the RSS measurements required by the topological map, it is observed that all of the MTs have to know the MAC-Ids of all other MTs serviced by the same AP, in order to be able to identify the MT with which it performs any RSS measurements. However, since the AP is also updating the mapping table in the case a new MT is joining the cell or an old one is leaving the cell, the addressing task places an even greater burden on the network as well as becoming rather complex. As stated earlier, the exchange of MAC-Ids between the AP and all of the MTs, periodically, may lead to a security issue.

OBJECTS OF THE INVENTION

It is an object of this invention to realize a Direct Mode communication between two mobile terminals (MTs) in access point (AP) controlled WLAN systems as efficiently and economically as possible.

It is also an object of this invention to realize AP controlled WLAN systems featuring Direct Mode communication between two mobile terminals within the same cell (same AP) as an optional linkup to that conventional/standard modes of WLAN communication.

It is a further object of this invention to realize a DM communication scheme between two MTs in AP controlled WLAN systems which is reliable and which avoids unnecessary waste of the scarce channel resource.

It is a still further object of this invention to realize a DM communication scheme between two terminals in AP controlled WLAN systems which avoid broadcasting information which is unnecessary for effecting a DM connection and thereby avoiding matters pertaining to security issues. (Security issues would likely result through an unnecessary exchange of local unit identifier addresses pertaining to the individual MTs of each AP.)

It is also an object of this invention to realize a DM communication scheme between two mobile terminals in AP controlled WLAN systems having reduced power consumption requirements as well as reduced waste of channel space.

SUMMARY OF THE INVENTION

The foregoing and other problems are overcome and the objects of the invention are realized through effecting AP controlled WLAN systems featuring DM communication between two mobile terminals serviced by the same AP, in accordance with the examples illustrated in the drawings and described in the specification.

Briefly, the invention features a method for Direct Mode communication between two mobile terminals in access point (AP) controlled WLAN systems. Such a DM scheme calls for (a) establishing that an initiating, first mobile terminal and a remote, second mobile terminal are associated to a same AP; (b) establishing that the remote, second mobile terminal supports a DM operation feature as does the initiating, first mobile terminal; (c) sending, by the AP, address identifiers of the first and second mobile terminals to the second and first mobile terminals, respectively, including granting of a frequency-power resource slot to each of the two mobile terminals to initiate received signal strength (RSS) measurements between the two mobile terminals; and (d) sending, to the AP, RSS measurements performed by the first and second mobile terminals of mobile terminal identifier messages (which are "hello" messages) sent to them by the second and first mobile terminals, respectively. DM communication between the first and second mobile terminals continues with exchange of information to conclusion when a mobile terminal identifying message is satisfactorily received by both mobile terminals and when a mobile terminal identifying message of either of the two mobile terminals is not satisfactorily received, DM communication setup is terminated. Under such condition, the AP can be requested to effect a communication linkup between the two mobile terminals using known/standard WLAN routing schemes, in which case the exchange of information would also flow to the AP.

In accordance with the present invention, an MT-initiated DM communication setup as well as an AP-initiated DM communication are possible. An MT-initiated DM connection can be effected in the case the initiating MT knows beforehand that the remote mobile terminal is associated to the same AP. The AP has a mapping table, kept in its database, of the local unique identifiers (which includes the MAC-Id, as one example) of each MT in its cell along with the corresponding higher layer protocol address associated therewith (e.g., Ethernet address, IP address, mobile phone numbers). The AP database also contains information of the DM capability of the MTs associated with that AP. Therefore, the AP is able to check its database to determine whether or not the remote MT is able to support a DM connection. If the remote, second MT supports a DM connection, it then can decide whether it wants to initiate DM linkup with the initiating, first MT. As to the AP-initiated DM scheme, the initiating, first MT does not know whether or not the remote, second MT is associated to the same AP and whether it is also DM capable. Accordingly, the initiating MT just sends a connection request to the AP with the corresponding higher layer protocol address of the destination. Consulting the database, the AP gives notice that the remote MT is also located in the same cell. From this point on, the AP initiates DM similarly as that in the MT-initiated DM communication setup scheme.

The DM connection scheme according to the present invention simplifies the current available scheme, for example, in ETSI EP BRAN (European Telecommunications Standards Institute Europe Broadband Radio Access Network) for Direct Mode (DM), as it pertains to the recent proposal for the HIPERLAN/2 Standard, July 1999. In accordance with the present invention, only two mobile terminals (MTs) and the associated access point (AP) are involved in any current DM communication setup and performance. All activity as it is related to an updating of a topological map (e.g., signaling), such as featured in the Sony proposal in HL14SON2a, July 1999, for the HIPERLAN/2 Standard, and as explained with regard to FIG. 10 of the present application, is avoided. Further, full updating of the mapping table does not involve in the broadcasting of local unique identifiers (LUIs) such as local MAC-Id addresses, although not limited thereto. Only the two MTs which are involved in any current DM connection setup receive information about each other from the mapping table. Also, power consumption as well as unnecessary waste of channel space, such as results in the topological map according to the above-noted proposal for the HIPERLAN Standard, is avoided. Additionally, the present DM communication setup scheme can be easily facilitated without too many complexity concerns.

BRIEF DESCRIPTION OF THE DRAWINGS

The above set forth and other featured aspects of the invention are made more apparent in the ensuing detailed description of the invention when read in conjunction with the related examples as described and illustrated in the accompanying drawings, wherein:

FIG. 1 is illustrative of the general principle of a Direct Mode (DM) communication in access point (AP) controlled WLAN systems according to the present invention;

FIG. 2 is illustrative of an example of a mapping table stored in an access point according to the present invention;

FIG. 10 is illustrative of a topology map kept by the AP computer according to the proposal in HL14SON2a of ETSI EP BRAN (European Telecommunication Standards Institute Europe Broadband Radio Access Network) No. 14, July 1999.

DETAILED DESCRIPTION OF THE INVENTION

Figure 3:
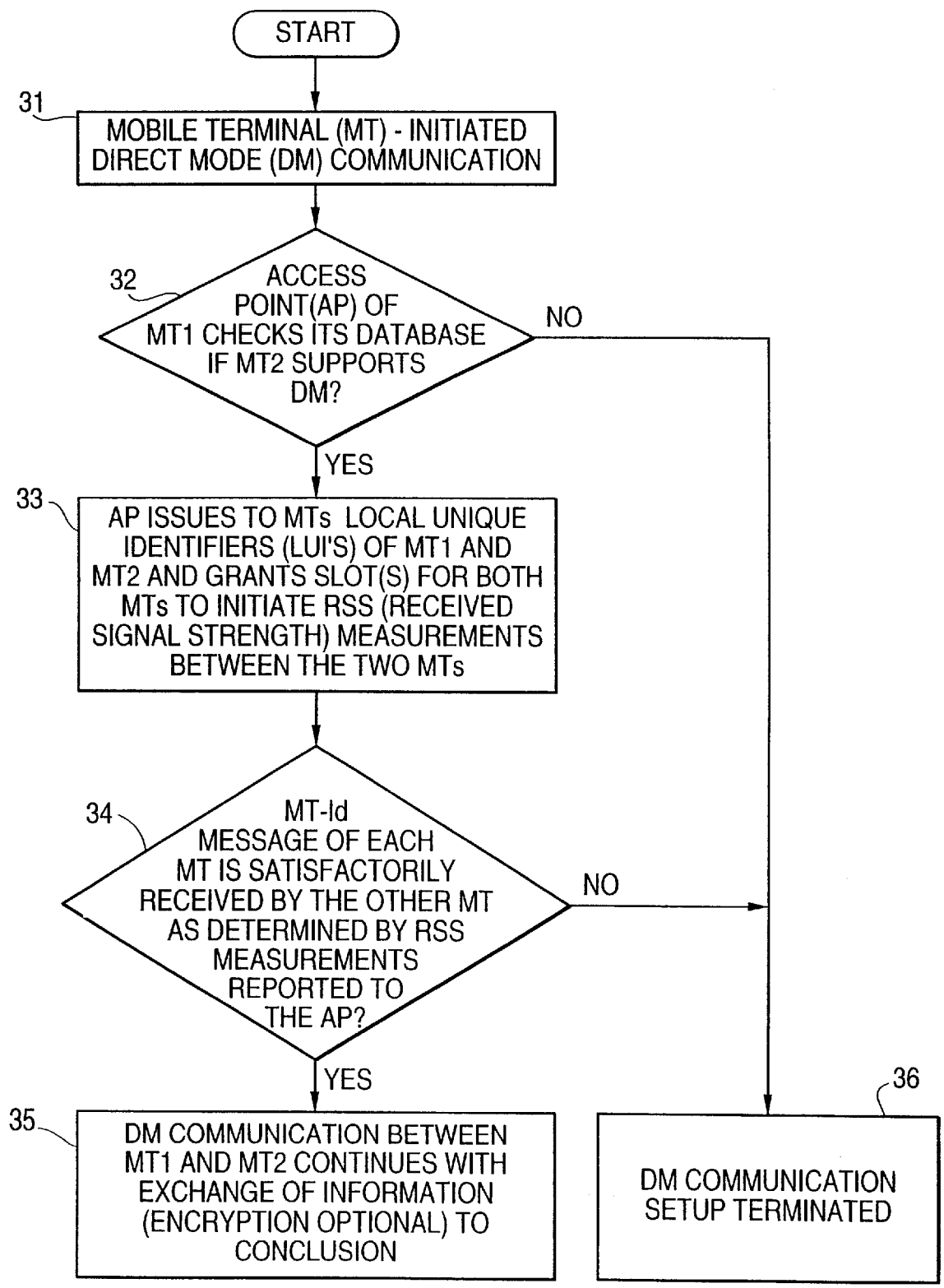
FIG. 3 illustrates a flowchart of the general principle of a mobile terminal (MT)-initiated DM communication method according to the present invention.

In FIG. 1, 10 is illustrative of the general principle involved in the DM communication method employed in AP controlled WLAN systems according to the present invention. In this illustration, 11 represents the AP which (e.g., AP computer) which has stored therein a regularly updated mapping table of all mobile terminals serviced by that AP and which mapping table is secured against unauthorized access during DM connection setup except for the accessing of the local identifiers pertaining to the two mobile terminals which are currently in a DM connection. 12 and 13 represent a pair of mobile terminals associated with that AP in which MT1 can be considered as the initiating terminal and MT2 as the remote terminal. As can be seen from FIG. 1, DM refers to a wireless direct communication linkup between two MTs serviced by the same AP in connection with AP controlled WLAN systems. The DM communication linkup is illustrated as the direct line connection between MT1 and MT2. The general principle of this illustration is that the AP maintains a regularly updated mapping table of all MTs associated with that AP. This mapping table is arranged to include the local unique identifier of each of the MTs associated with that AP. The local identifiers can be represented as local MAC-Id addresses, although not limited thereto, which can be multi-bit protocol addresses servicing the cell. Linked to each local MAC-Id address is the higher layer address corresponding to that MT, the higher layer address can be an Ethernet address, an IP address, a mobile phone number, and the like.

It is emphasized, the access point (AP) has the control function in any situation associated with a Direct Mode (DM) connection setup. Once a new MT (e.g., a mobile phone user, notebook or laptop computer user, etc.) wants to join the service provided by a wireless LAN system, the new MT evaluates the most convenient AP which it should become associated with. It is emphasized, the term "convenient" in the expression "convenient AP" is determined by characteristics such as the wireless radio link quality, the availability of the AP and so on. In the case in which the MT is available to track one AP, different information exchange takes place during the so-called association phase. For example, during this association phase, AP and MT agree on a certain transmission frequency. Moreover, the AP associates a unique local MAC-Id address to the new MT. The purpose of this MAC-Id or another LUI which may be used is to solve the addressing problem within an AP controlled WLAN system. The new MT has a unique address within the wireless LAN system, specified, for example, as NET-Id (network identifier), AP-Id (access point identified) and MAC-Id (medium access control identifier). Therefore, since all of the MTs associated with the same AP have respectively different MAC-Ids, they can be individually addressed with little difficulty. Accordingly, for any MT which wants to communicate with another MT associated to the same AP, it is necessary for the initiating MT to obtain the MAC-Id address of the other, remote MT. This can easily be achieved through implementing a mapping table in the AP database such as mapping table 20 in FIG. 2 of the drawings, although not limited thereto. In accordance with such mapping table, all that is necessary is for the initiating MT user to dial in the higher layer address, e.g., Ethernet address, IP address, mobile phone number, and the like in its request message to the associated AP. Using a regular telephone call as an example, we could think of the following mapping correspondence:

| Country Code | NET-Id |
|---|---|
| Area Code | AP-Id |
| Personal Number | MAC-Id |

It is noted that each AP keeps a mapping table in its convergence layer (CL) and has as a responsibility the assignment of unique MAC-Ids to MTs associated to that cell (AP). The mapping table that is stored in the AP relates the MAC-Id to the corresponding higher layer address of the MT, as noted. This relationship is necessary, since the MT user is not allowed to know anything about the local identifiers. Therefore, during any DM connection setup request, the destination is specified by its higher layer address (e.g., IP address, Ethernet address, mobile phone number and the like). Using FIG. 2 as an example, when sending an e-mail to a known party, it is assumed that we know its higher layer address (e.g., john.smith@nokia.com) and know nothing about a possibly existing local identifier directed thereto. It is then the task of the associated AP to evaluate the corresponding local MAC-Id address from the mapping table needed for addressing (assuming the destination is MT associated to the same cell). In the case in which the destination or remote MT is not associated to the same AP as that of the initiating MT, the corresponding connection request would then be handled in a known standard or classical way (e.g., the router of the WLAN takes care of the correct packet of information to be forwarded to the correct destination). In the case in which a MT is leaving its cell (e.g., the mobile phone is shut down, the mobile terminal is handed over to another user, and so forth), the AP will disassociate the MT and the corresponding MAC-Id address would then be available for a new MT to enter that service set (cell or AP). Also, during the association phase, the MT informs the AP, whether that initiating MT is DM capable, that is, whether DM has already been implemented in that MT. Any MT which wishes to initiate a DM wireless connection with another MT within that cell must be DM capable since in any standard AP controlled WLAN system including but not limited to the HIPERLAN/2 Standard proposed, this may eventually become an optional feature standard thereof. Any standard designed to have such feature would therefore not be required to support DM operation at all.

Figure 9:
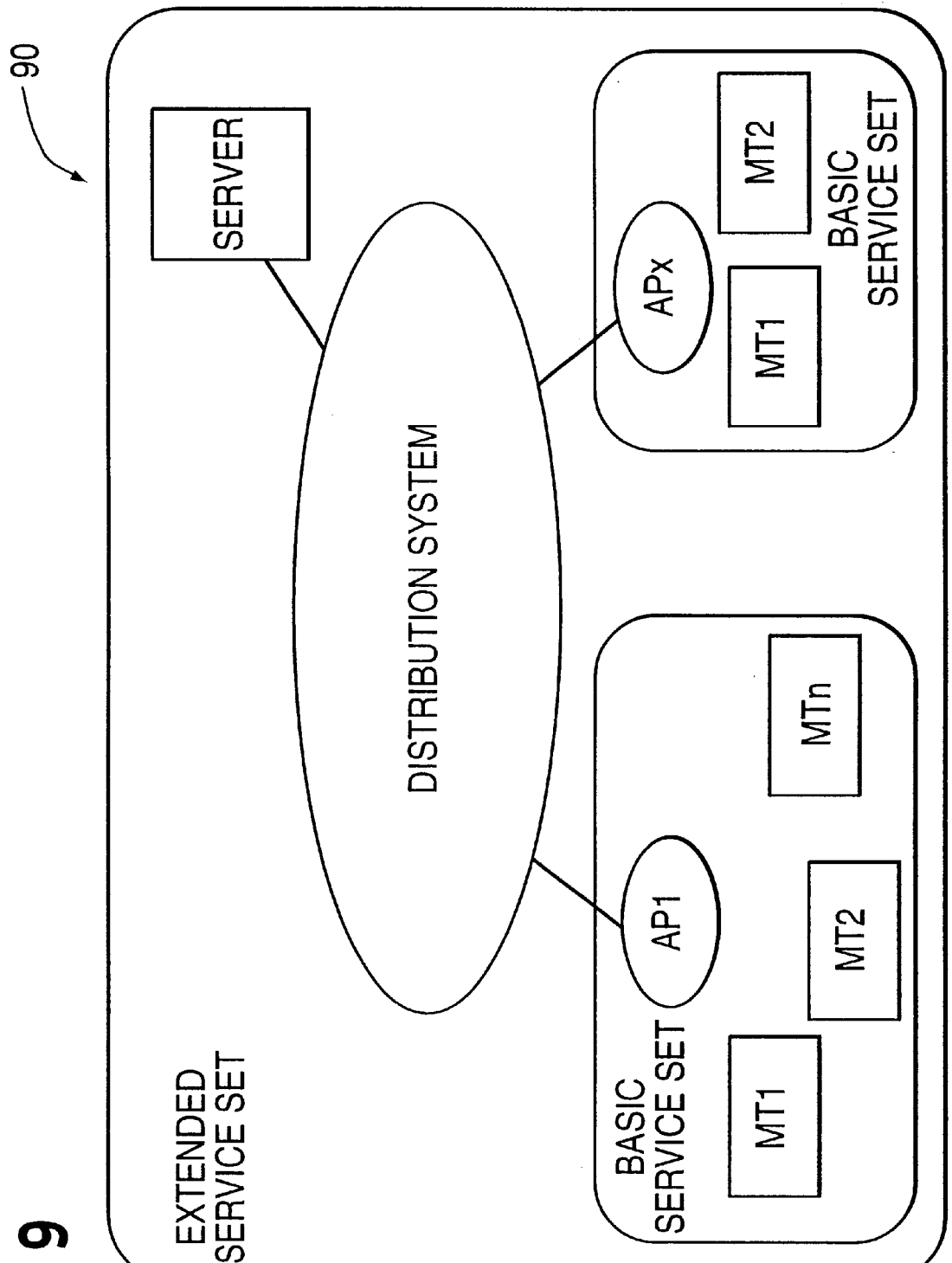
FIG. 9 is a block diagram illustration typifying standard access controlled WLAN systems to which DM communication within a basic service set (cell) can be effected, according to the present invention.

The present invention supports both MT-initiated Direct Mode setup as well as an AP-initiated Direct Mode setup. FIG. 3 of the drawings shows a flowchart of the method performed with regard to an MT-initiated DM communication, represented by 31 in FIG. 3. In accordance with this DM setup scheme, it is assumed that the initiating mobile terminal MT1 knows a priori to the connection request that the destination or remote MT2 is associated to that same AP. This would be the case, for example, when one has to send some data to a colleague in the same office area. If the remote MT2 is found to support DM, as a result of the associated AP being able to check its database, it can decide on initiating Direct Mode (step 32 in FIG. 3). In order for both the MT1 and MT2 of the service set such as in FIG. 1 and FIG. 9, although not limited thereto, to be able to communicate with each other by DM, each must have access to the other's local unique identifier corresponding thereto (e.g., MAC-Id in HIPERLAN/2 Standard, although not limited thereto). This is needed for both MTs to be able to identify each other. The AP will issue to the MTs the LUIs pertaining to only those MTs and also grant slots (e.g., channel resource slots of a frame) for both MTs in order to allow them to initiate RSS measurements between them (step 33). The RSS measurement results obtained by both MTs are sent to the associated AP. If MT1 as well as MT2 has satisfactorily received the "hello" message signal of the other mobile terminal such as a local unique identifier message (e.g., MAC-Id in HIPERLAN/2 Standard, etc.), the DM communication setup can be continued to communicate additional information between both terminals to conclusion (step 35). If, however, MT2 cannot support DM communication or the "hello" signals are not satisfactorily received, then the DM communication setup is terminated (step 36) in which case the AP can be requested to proceed with the communication setup within a normal/standard manner, where the data flow is also handled by the AP (as opposed to a DM connection, where the AP is used only for providing a control function).

Figure 4:
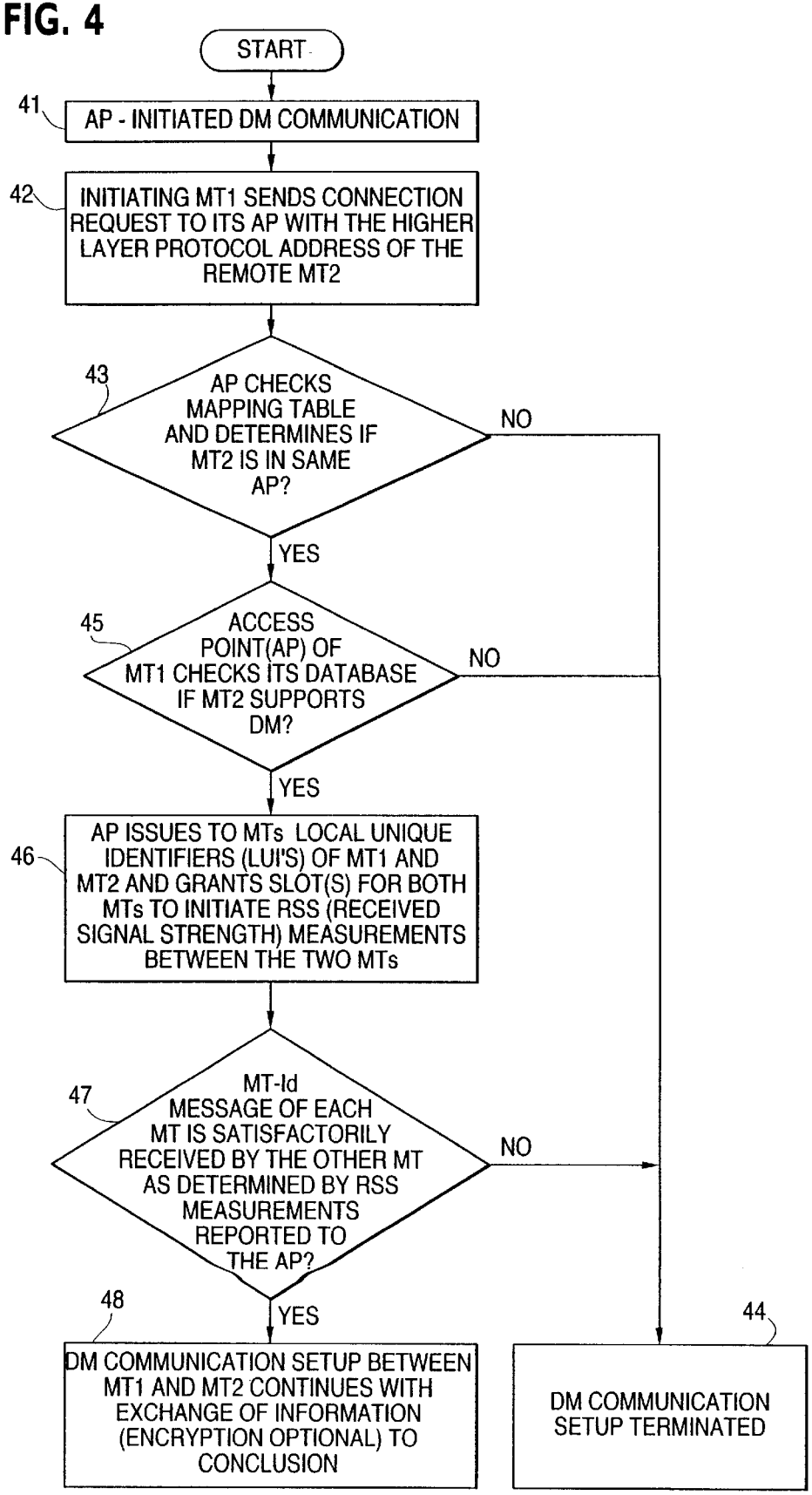
FIG. 4 illustrates a flowchart of the general principle of an AP-initiated DM communication method according to the present invention.

On the other hand, in AP-initiated DM communication setup, the initiating MT1 does not know that the remote MT2 is associated to the same AP and is unsure whether MT2 is DM capable. According to this setup scheme, which is illustrated, according to one example, by the flowchart in FIG. 4 of the drawings, the initiating MT just sends a connection request message to the associated AP along with the corresponding higher layer protocol address corresponding to the destination or remote MT2 (step 42). Consulting the mapping table in a database of the associated AP will establish that the remote MT2 is located within that cell (same AP) (step 43). Therefore, beginning with step 45, the method is the same as that corresponding to an MT-initiated DM. Also according to FIG. 4, DM communication setup is terminated if, as a result of a lookup in the mapping table, it is determined that the remote MT2 is not in the same AP as the initiating MT1 (step 44).

Figure 5:
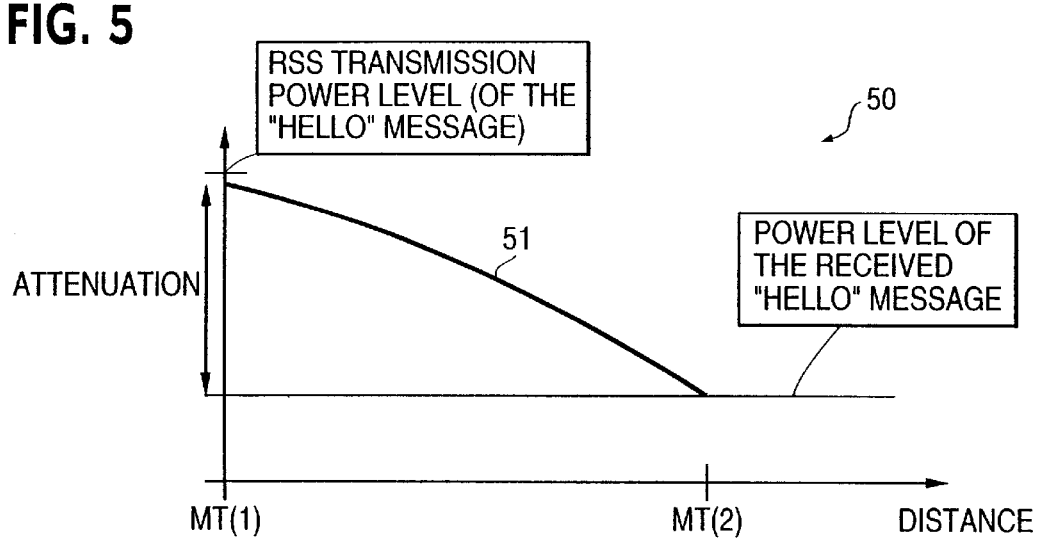
FIG. 5 illustrates a relationship of the influence of distances in received signal strength (RSS) measurements between mobile terminals during DM setup, according to the present invention.

As to achieving RSS measurements, as one example, it will be mandatory in the HIPERLAN/2 Standard based on the most recent proposal of July 1999, referred to earlier, for both the access points (AP) as well as the mobile terminals (MTs) directed thereto to provide RSS measurements. Under a non-DM connection situation, this information will be used with regard to agreeing on an appropriate physical mode (e.g., modulation scheme to provide the best performance of the wireless radio link) between an MT and an associated AP. In a DM connection setup, on the other hand, it is necessary that both MTs involved check the quality of their wireless radio linkup. For instance, the linkup between the AP and the corresponding MTs may be quite satisfactorily. However, because of the presence of some metal conditions which may become obstacles, for example, iron metal located between MT1 and MT2, DM would not be possible since the attenuation factor of the signal being transferred would be too substantial. It is a task of the access points (APs) during this RSS measurement to synchronize both of the MTs when they are performing the RSS measurements. This includes, basically, the granting of the corresponding time slot in the MAC frame, during which one of the MTs is sending a "hello" message at a certain transmission power level and a given modulation scheme (e.g., that which will be defined in the standard). During that time, the other one of the two MTs is listening and performing the RSS measurement associated with the "hello" message transmitted by the first mentioned MT. Accordingly, the AP effects the synchronizing of the RSS measurements of both MTs. It is emphasized, these measurements have to be performed in both directions. The corresponding measuring result is then sent to the associated AP which decides whether a feasible DM wireless radio communication can be setup. The principle of RSS measurement can be seen by the illustration in FIG. 5 of the drawings in which 50 represents the RSS measurement in terms of power level and its effect resulting from attenuation during the transmission from one MT to the other. Reference 51 is an example of the steep attenuation effected in the strength of the message by the time it reaches the receiving station. It should also be noted, every data transmission is controlled by the AP, since it grants some up/down link slots for MTs associated with the same AP. Therefore, that AP is aware of any information exchange being effected between any two MTs associated to that AP.

When considering a DM communication setup in an AP controlled WLAN system, the following different scenarios must be given consideration:

(a) two MTs are DM capable and are also located close enough to set up a DM connection;
(b) two MTs are DM capable but, however, are too far away from each other;
(c) only one of the two MTs can support a DM; and
(d) both MTs are not associated to the same AP.

These different scenarios and corresponding actions being taken will become clearer when going through the following additional discussions/examples.

Establishing a DM connection setup involves a number of different phases, including: an association phase, request, response, RSS measurements and exception handling. Discussion directed thereto will be given hereinbelow in conjunction with the related illustrations.

I. Association Phase

Since the HIPERLAN2 Standard being proposed is to become core-network independent, the mapping of the core-network dependent parameters into the HIPERLAN2 specific parameters becomes the task of the convergence layer (CL). When initiating a connection setup, the convergence layer provides the HIPERLAN specific connection parameter at the DLC-control (data link control user connection). We will now refer back to the mapping table, which maps, for example, the local MAC-Id of each MT to its corresponding, for example, IP address. Accordingly, as mentioned before, the MTs that are being considered become registered (e.g., they have assigned NET-Id, AP-Id, MAC-Id) within the same cell or service set, which is controlled by a single AP. The exact procedure corresponding to this association phase is the same as that for usual uplink/downlink communication setups and will not be mentioned here. It involves procedures such as associating new MAC-Ids to new MTs, an encryption key exchange and information about DM capability.

II. Request/Response Phase

This section is particularly case-sensitive, in the sense that the initiating MT either knows beforehand that the other MT of the intended DM setup to be initiated is associated to the same AP or it is not. In this connection, we will now discuss two additional examples of the present invention.

(i) MT-initiated Direct Mode

Figure 7:
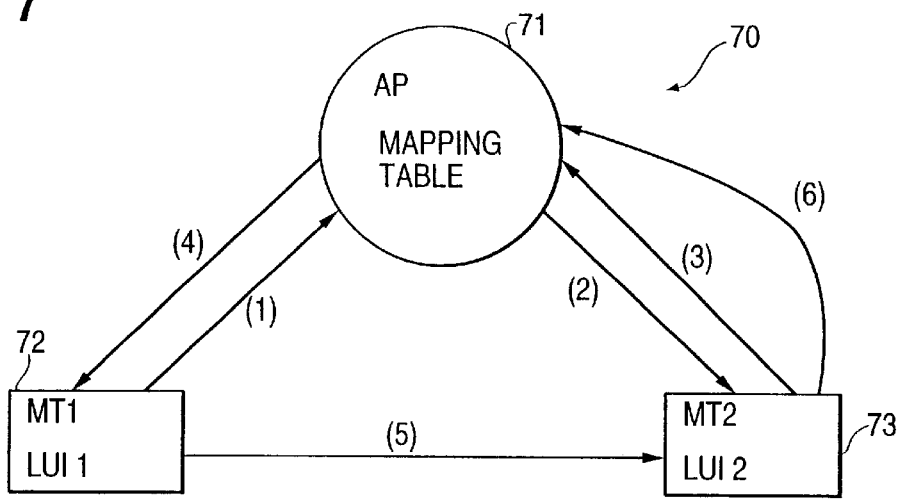
FIG. 7 illustrates communication interaction of a DM setup of the detailed example in FIG. 6, according to the present invention.
Figure 6:
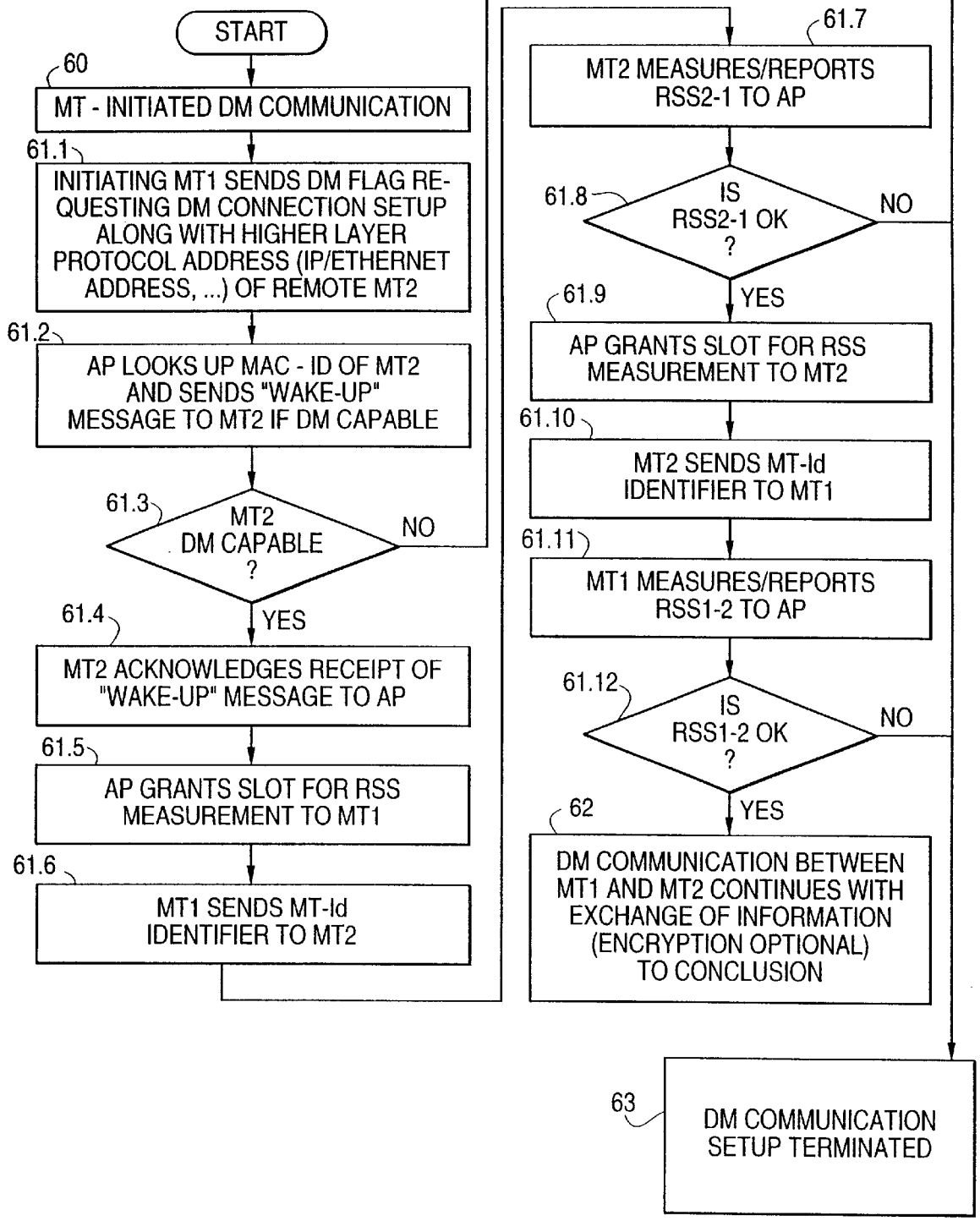
FIG. 6 illustrates a flowchart of a detailed example of a MT-initiated DM communication method according to the present invention.

With regard to this initiated DM scheme, one is referred to the illustrations in FIGS. 6 and 7 of the drawings in which FIG. 6 illustrates a flowchart according to another, detailed example of an MT-initiated DM setup scheme. According to this example, MT1 of the example in FIG. 7 knows a priori that the mode MT2 is associated to the same AP. Accordingly, the MT1 will request for a DM connection setup. This could be done, for example, by setting a DM-flag and by MT1 sending a connection request to the associated AP 71 with the corresponding higher layer protocol address (e.g., an IP address, Ethernet address, mobile phone number, etc.) of the remote MT2, shown as 73 in FIG. 7. (Step 61.1 in FIG. 6.) This is followed by AP sending a "wake-up" message to the remote MT2 by specifying that a certain (initiating) MT1 wishes to have a DM connection with MT2 and grants slot(s) to which the MT2 is required to listen at and to perform the RSS measurements once the initiating MT1 sends a "hello" message.

At this point of the procedure, the MTs are usually in an inactive/standby state, assuming they are not involved in any current communication. This MT-initiated DM setup scheme will now be further detailed including relating the same to FIGS. 6 and 7. In this example, it is assumed that TCP/IP (transmission control protocol/internet protocol) is supported.

We will now detail the various steps involved in this example.

(1) MT1 sends a request to AP: request (IP@MT2, DM-flag=on)(step 61.1 in FIG. 6 and 1 in FIG. 7);
(2) AP looks up the corresponding MAC-Id of MT2 in its database. If remote MT2 is DM capable (i.e., DM implemented), AP sends a "wake-up" message:
wake-up (cause=DM request by IP@MT1 with MAC-Id1,grant slot(s)) (steps 61.2, 61.3 in FIG. 6 and 2 in FIG. 7);
(3) MT2 sends a positive acknowledgement to AP upon receiving the message (step 61.4 in FIG. 6 and 3 in FIG. 7);
(4) AP grants a slot for RSS measurement to MT1: ack (MAC-Id2 of remote MT2, grant (slot))(step 61.5 in FIG. 6 and 4 in FIG. 7);
(5) MT1 sends a "hello" message to remote MT2 during the granted slot. The "hello" message (i.e., an MT identifier) could consist of the following information: hello (MAC-Id1, MAC-Id2, NET-Id, AP-Id) (step 61.6 in FIG. 6 and 5 in FIG. 7;
(6) MT2 measures RSS signal sent by MT1 and reports it to the associated AP (steps 61.7 and 61.8 in FIG. 6 and 6 in FIG. 7);
and then MT2 sends a "hello" message to MT1, once the AP grants further slots (steps 61.9 through 61.12 in FIG. 6 are a repetition of steps 61.5 to 61.8 in FIG. 6). At this point, during the association phase, both the AP and MTs have agreed on an encryption key and, therefore, any exchange of information such as the sending of the MAC-Ids of the two MTs involved in DM can be encrypted, which is a known and standard practice.

(ii) AP-initiated Direct Mode Communication Setup

In this case, the initiating MT1 does not know that the remote MT2 is associated to the same AP. Therefore, the initiating MT just sends a connection request message to the AP along with the corresponding higher layer protocol address of the remote MT2. The associated AP will notice (may be through the local LAN router, which routes the information packet back to the AP) that the remote MT2 is, in fact, located in the same cell (same AP).

Therefore, the AP can make a request to the initiating MT1 to establish a DM connection in the manner as that discussed with regard to steps 1 to 6 detailed above. Under both the MT as well as the AP initiated DM connection setup schemes, if the remote MT2 is found not to be DM capable or the RSS measurements are deemed unsatisfactory, DM communication setup is terminated (step 63 in FIG. 6). Of course, also, if with regard to an AP-initiated DM setup scheme, the remote MT2 is found not to be associated to the same AP as that of the initiating MT1, the DM communication setup would be terminated at that point, also.

III. RSS Measurement

At the time of the RSS measurement, the initiating MT1 has now a unique Id of the remote MT2, namely, NET-Id, AP-Id, which would be the same for both MTs as well as a personal local MAC-Id. It will now transmit, assuming MT1 has received the resource grant from the AP, a "hello" message, where the unique Id of the remote host and the MAC-Id of the initiating host are included. This transmission, as explained earlier, is done at a predefined power level and modulation scheme such as that predefined in the proposed HIPERLAN2 Standard, although not limited thereto. Since the "hello" message includes the NET-Id, AP-Id and MAC-Id of the remote MT2, upon reception therefor the correct destination of such message can be checked by simply comparing the received unique Id with its own one. Hence, the connection setup between the intended pair of MTs can be guaranteed.

Now let us proceed with the following example pertaining to the transmission of the "hello" message as it relates to steps 61.6–61.8 and, similarly, steps 61.10–61.12 in FIG. 6 as well as 5 and 6 in FIG. 7.

(5'). MT1 sends the "hello" message to MT2 with a predefined transmission power level and a modulation scheme:
hello (MAC-Id1, MAC-Id2, NET-Id, AP-Id)
(6'). MT2 is listening at the corresponding slot and performs RSS measurement upon receiving the "hello" message. Furthermore, MT2 checks whether the "hello" message is from the right sender (i.e., compares the MAC-Id in the message received from the sender with the one issued by the AP during the request phase).

Figure 8:
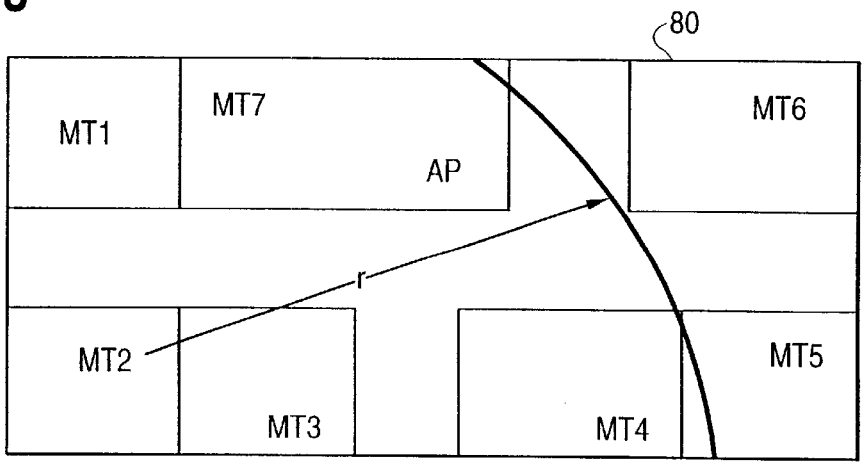
FIG. 8 is illustrative of a broadcast range of MT in, for example, a building when initiating a DM connection setup according to the present invention.

A possible situation for a WLAN can be seen from the illustration in FIG. 8 of the drawings in which 80 represents a building where WLAN is set up. The radius "r" specifies the maximum range for which a DM of MT2 results in an acceptable direct mode radio link quality with one of the MTs within that range. For instance, the RSS measurement results with MT6 would not be considered to be sufficient by the associated AP and, therefore, a DM connection will not be initiated. As noted earlier, DM is only possible between MTs connected to the same AP. A next step would be to perform the RSS measurement in the other link direction. Namely, MT2 sends out a "hello" message during the resource slot(s) granted by the associated AP, and MT1 performs measurements. Upon receiving the RSS measurement results, the associated AP will decide whether a certain DM wireless radio link quality can be guaranteed. DM communication will further be established (i.e., both MTs will agree on the best modulation scheme, and so forth). If such satisfactory quality linkup cannot be established, both MTs can communicate in a non-direct mode, as discussed earlier. Under such condition, the AP will also be responsible for correct data flow.

In the just-completed example, the APs actions of a WLAN system are as follows:

(i) AP receives the RSS measurement results from MT2. Since MT2 knows which time slot MT1 is sending the "hello" message, MT2 can always reveal something about the RSS level even if it did not receive a discernable signal. Therefore, the attenuation of the signal becomes rather important. In such a case, there could be agreed-to a default value to send.

(ii) AP receives the RSS measurement results from MT1. The same considerations apply also in this case.

(iii) Now, the AP has to decide on further actions to take on the basis of the following rule:
If {RSS-MT1 and RSS-MT2>threshold}
then proceed further DM setup:
 else
  proceed in non DM.

The threshold, in this case, describes the minimum power level for which a certain DM radio link quality can be guaranteed. However, before any information is transmitted in DM, the two MTs have to agree on further points such as the base modulation scheme or an encryption key for maintaining a secured data transmission. This information exchange will be controlled by the AP by granted slot(s). One thing is noted, it is not possible to guarantee a DM connection a priori to the request of the initiating MT since one would not have any information about the current location of the remote MT. The only information obtained before RSS measurements are performed is whether or not the MTs are DM capable. Therefore, only after the RSS measurements are obtained can a DM communication proceed between a pair of MTs within the same AP.

While the invention has been particularly shown and described with respect to the above examples and related illustrations, it will be understood by those of ordinary skill in this area of technology that changes in form and in details may be made therein, including in the form of other embodiments, without departing from the scope and spirit of the invention, which is defined by the appended claims.

What is claimed is:

1. In access point (AP) controlled wireless local area network (WLAN) systems, a method for direct mode (DM) communication between two mobile terminals, comprising:
    (a) establishing that an initiating, first mobile terminal and a remote, second mobile terminal are associated to a same AP, including
        (i) sending by the initiating, first mobile terminal a connection request to its AP with corresponding higher layer protocol address of the remote, second mobile terminal, and
        (ii) look-up, by the AP, of medium access control identifier (MAC-Id) of the remote, second mobile terminal in a database of the AP,
        wherein the MAC-Id of the second mobile terminal represents a unique address of that terminal within a service area of that AP, and
        wherein said database contains a mapping table including the MAC-Ids and corresponding higher layer protocol addresses of all mobile terminals within the service area of that AP;
    (b) establishing that the remote, second mobile terminal supports a DM operation feature as does the initiating, first mobile terminal;
    (c) sending, by the AP, address identifiers of the first and second mobile terminals to the second and first mobile terminals, respectively, including granting of a channel resource slot of a frame to each of the two mobile terminals to initiate received signal strength (RSS) measurements between the two mobile terminals;
    (d) sending RSS measurements performed by the first and second mobile terminals to the AP of mobile terminal identifier messages sent to them by the second and first mobile terminals, respectively; and
    (e) deciding on whether to continue DM communication based on the results of the RSS measurements,
    wherein DM communication between the first and second mobile terminal continues with exchange of information to conclusion when a mobile terminal identifier message is satisfactorily received by each mobile terminal and when a mobile terminal identifier message is not satisfactorily received, the DM communication setup is terminated and the AP can direct a communication linkup in which the exchange of information also flows to the AP.

2. The method according to claim 1, wherein in step (a)(ii), the MAC-Ids contained in the mapping table are represented as multi-bit local addresses within the service area of their AP.

3. The method according to claim 1, wherein the higher layer protocol addresses in said mapping table include internet protocol (IP) addresses.

4. The method according to claim 1, wherein the higher layer protocol addresses in said mapping table include Ethernet addresses.

5. The method according to claim 1, wherein in step (a)(ii) if the AP cannot locate the MAC-Id corresponding to the higher layer protocol address of the remote, second mobile terminal, DM communication setup is terminated.

6. The method according to claim 1, wherein step (b) includes:
    (i) looking up, by the AP, the corresponding MAC-Id of the remote, second mobile terminal to determine if the second mobile terminal has a DM option, and
    (ii) if the second mobile terminal is DM capable, the AP sends message to the second mobile terminal alerting same of DM request by the first mobile terminal at which time the second mobile terminal decides to accept/not accept initiating setup of DM, and if the second mobile terminal is not DM capable, communication between the first and second mobile terminals can instead be setup for data flow to be routed through the AP.

7. The method according to claim 6, wherein in step (c) the address identifiers include the MAC-Ids.

8. The method according to claim 7, wherein in step (d) the mobile terminal identifier message is a local unique identifier containing the MAC-Id, network identifier (Net-Id) and access point identifier (AP-Id) of the transmitting mobile terminal.

9. The method according to claim 8, wherein all information exchanged between the two mobile terminals during DM operation is encrypted, the encryption being provided via agreed on encryption key between the AP and both mobile terminals.

10. The method according to claim 1, wherein each mobile terminal includes any one of a mobile or cell phone, a WLAN PC card, and the like.

11. The method according to claim 5, wherein step (b) includes:
    (i) looking up, by the AP, the corresponding MAC-Id of the remote, second mobile terminal to determine if the second mobile terminal has a DM option, and
    (ii) if the second mobile terminal is DM capable, the AP sends message to the second mobile terminal alerting same of DM request by the first mobile terminal at which time the second mobile terminal decides to accept/not accept initiating setup of DM, and if the second mobile terminal is not DM capable, communication between the first and second mobile terminals can instead be setup for data flow to be routed through the AP.

12. The method according to claim 11, wherein in step (c) the address identifiers include the MAC-Ids.

13. The method according to claim 12, wherein in step (d) the mobile terminal identifier message is a unique identifier containing the MAC-Id, network identifier (Net-Id) and access point identifier (AP-Id) of the transmitting mobile terminal.

14. The method according to claim 13, wherein all information exchanged between the two mobile terminals during DM operation is encrypted, the encryption being provided via agreed on encryption key between the AP and both mobile terminals.

15. The method according to claim 14, wherein the higher layer protocol addresses in said mapping table are internet protocol (IP) addresses.

16. The method according to claim 14, wherein the higher layer protocol addresses in said mapping table are inclusive of Ethernet addresses.

17. In access point (AP) controlled wireless local area network (WLAN) systems, a mobile terminal (MT) initiated direct mode (DM) communication method between any two mobile terminals (MTs) in a service area of a same AP, comprising:

(a) sending of a request by an initiating, first mobile terminal (MT1) to the AP for a DM connection setup with a remote, second mobile terminal (MT2);

wherein the sending of a request includes sending of a direct mode flag (DM-flag) along with higher layer protocol address of remote MT2 to the AP;

(b) establishing that MT2 is DM capable as is MT1;

(c) sending, by the AP, address identifiers of MT1 and MT2 to MT2 and MT1, respectively, including granting of a channel resource slot of a frame to each of the two MTs to initiate received signal strength (RSS) measurements between the two MTs;

(d) sending RSS measurements performed by MT1 and MT2 to the AP of mobile terminal identifier messages sent to them by MT2 and MT1, respectively; and (e) deciding on whether to continue DM communication based on the results of the RSS measurements, wherein DM communication between MT1 and MT2 continues with exchange of information to conclusion when a mobile terminal identifier message is satisfactorily received by each MT and when a mobile terminal identifier message is not satisfactorily received, the DM communication setup is terminated and the AP can direct a communication linkup in which the exchange of information also flows to the AP.

18. The method according to claim 17, wherein said higher layer protocol address includes an internet protocol (IP) address.

19. The method according to claim 17, wherein said higher layer protocol address includes an Ethernet address.

20. The method according to claim 17, wherein step (b) includes:

(i) looking up, by the AP, a corresponding medium access control identifier (MAC-Id) address of MT2 to determine if MT2 has a DM option, and (ii) if MT2 is DM capable, the AP sends a message to MT2 alerting MT2 of DM request by MT1, at which time MT2 decides to accept/not accept initiating setup of DM and if MT2 is not DM capable, communication between MT1 and MT2 can instead be setup for data flow to be routed through the AP.

21. The method according to claim 20, wherein in step (c) the address identifier includes the MAC-Ids.

22. The method according to claim 21, wherein in step (d) the mobile terminal identifier message is a local unique identifier containing the MAC-Id, network identifier (Net-Id) and access point identifier (AP-Id) of the transmitting mobile terminal.

23. The method according to claim 22, wherein all information exchanged between the two mobile terminals during DM operation is encrypted, the encryption being provided via agreed on encryption key between the AP and both mobile terminals.

24. The method according to claim 17, wherein each mobile terminal includes any one of a mobile or cell phone, WLAN PC card, and the like.

25. The method according to claim 23, wherein said higher layer protocol address includes an internet protocol (IP) address.

26. The method according to claim 23, wherein said higher layer protocol address includes an Ethernet address.

* * * * *